(12) United States Patent
Kobayashi et al.

(10) Patent No.: US 7,789,566 B2
(45) Date of Patent: Sep. 7, 2010

(54) DYNAMICAL PRESSURE BEARING DEVICE, MOTOR, AND RECORDING DISC DRIVING DEVICE

(75) Inventors: Toshimasa Kobayashi, Kyoto (JP); Masaki Nakamura, Kyoto (JP); Taketo Nishimura, Kyoto (JP); Hisatomu Yamamoto, Aichi (JP); Hideaki Ogata, Aichi (JP); Masaharu Ishiwata, Kanagawa (JP); Tomoyuki Iga, Kanagawa (JP); Yoko Yamagata, Kanagawa (JP)

(73) Assignee: Nidec Corporation, Kyoto (JP)

( * ) Notice: Subject to any disclaimer, the term of this patent is extended or adjusted under 35 U.S.C. 154(b) by 1085 days.

(21) Appl. No.: 11/296,376

(22) Filed: Dec. 8, 2005

(65) Prior Publication Data

US 2006/0132968 A1    Jun. 22, 2006

(30) Foreign Application Priority Data

Dec. 9, 2004    (JP)    ............... 2004-356378

(51) Int. Cl.
*F16C 32/06*    (2006.01)
(52) U.S. Cl. .................................... 384/100
(58) Field of Classification Search ................ 384/100, 384/107, 114, 132
See application file for complete search history.

(56) References Cited

U.S. PATENT DOCUMENTS

| 4,445,793 | A | 5/1984 | Shinohara |
| 5,578,688 | A | 11/1996 | Ito et al. |
| 6,513,979 | B2 | 2/2003 | Mori et al. |
| 6,685,356 | B2 | 2/2004 | Hirata |
| 2004/0132881 | A1 | 7/2004 | Okamiya et al. |

FOREIGN PATENT DOCUMENTS

| JP | 08-199101 A | 8/1996 |
| JP | 10-156282 A | 6/1998 |
| JP | 2004-211851 A | 7/2004 |

OTHER PUBLICATIONS

Japanese Office Action dated Sep. 25, 2007 of JP 2004-356378.

*Primary Examiner*—Thomas R Hannon
(74) *Attorney, Agent, or Firm*—Westerman, Hattori, Daniels & Adrian, LLP

(57) ABSTRACT

There is provided a dynamical pressure bearing device, a motor and a recording drive device. The dynamical pressure bearing device has a shaft having a first bearing surface and a first portion exteriorly adjacent to the first bearing surface; and a sleeve having a second bearing surface and a second portion exteriorly adjacent to the second bearing surface. The sleeve is rotatably engaged with the shaft with a clearance. The oil repellent film includes a fluorine polymer having a perfluoroalkyl group; and a chromogenic substance which makes color development in blue at UV irradiation.

7 Claims, 11 Drawing Sheets

| weight of polymer (wt%) | 0.01 | 0.05 | 0.1 | 0.2 | 8 | 15 | 30 | 40 |
|---|---|---|---|---|---|---|---|---|
| contact angle | △ | ◎ | ◎ | ◎ | ◎ | ◎ | ◎ | ◎ |
| absence of crack | ◎ | ◎ | ◎ | ◎ | ◎ | ◎ | ◎ | △ |

Fig. 9

| Density of fluorescent pigment (wt ppm) | 400 | 500 | 600 | 800 | 1500 | 3000 | 10000 | 15000 |
|---|---|---|---|---|---|---|---|---|
| Visibility in stainless | △ | ○ | ○ | ◎ | ◎ | ◎ | ◎ | ◎ |
| Adhesion in stainless | ◎ | ◎ | ◎ | ◎ | ◎ | ◎ | ○ | △ |

Fig. 10

| | working example 1 | comparative example 1 | comparative example 2 |
|---|---|---|---|
| Total outgas (μg/cm²) | 0.075 | 0.068 | 0.065 |
| Siloxane (μg/cm²) | N.D. | N.D. | N.D. |

Fig. 11

DYNAMICAL PRESSURE BEARING DEVICE, MOTOR, AND RECORDING DISC DRIVING DEVICE

The patent or application file contains at least one drawing executed in color. Copies of this patent or patent application publication with color drawing(s) will be provided by the Office upon request and payment of the necessary fee.

FIELD OF THE INVENTION

The present invention relates to a dynamical pressure bearing device, and more in detail, to a dynamical pressure bearing device used in a motor for a driving recording media, in particular a disc-shaped recording media including magnetic or optical discs which are known as hard discs and optical memory discs such as CDs and DVDs. The present invention also relates to a motor including the dynamical pressure bearing device, and further relates to a recording disc driving device including the motor.

DESCRIPTION OF THE RELATED ART

As the bearing structures inside the motors used for hard disc driving devices, ball bearings have been used. It has been requested to miniaturize the devices as well as to decrease the vibrations and noises generated, and then a bearing called as a fluid type dynamical pressure bearing device has been recently developed and commercialized.

The fluid dynamical pressure bearing device generally comprises a shaft and a sleeve, which are engaged with each other in a rotatable manner. The shaft and the sleeve are provided with a radial bearing for supporting the load worked in the radial direction thereof and a thrust bearing for supporting the load worked in the length direction thereof. Either in the radial bearing and thrust bearing, the bearing surface of the sleeve is opposed to the bearing surface of the shaft with a clearance or minute gap, and at least one of the bearing surfaces has formed a dynamical pressure generation groove. The clearance is filled with a lubricant.

In case of the dynamical pressure bearing device having such a structure, when the shaft is rotated, the lubricant held at the clearance is pressed along the groove pattern of the dynamical pressure generation groove, thereby generating a pressure increased at local portions in the lubricant. Thereby, the load worked on the shaft in the radial direction is supported by a pair of the radial bearings, and the load worked on the shaft in the thrust direction is supported by a pair of the thrust bearings.

In such a dynamical pressure bearing device, the lubricant can be run through the surface of the shaft and/or the sleeve, so that it could be leaked to the outside. In order to prevent such leakage of the lubricant, an oil repellent treatment is necessary to form an oil repellent agent film on the portion exteriorly adjacent to the space of the dynamical pressure bearing in which the lubricant is filled. The oil repellent treatment can be performed on either or both surfaces of the shaft and the sleeve. Since the oil repellent film has an oil repellent feature, it can avoid the oozing or leakage of the lubricant.

However, the oil repellent agent applied on the shaft and the sleeve is generally a transparent and colorless liquid. Thus, it is difficult to check the application or formation of the oil repellent agent by eyes during or after the oil repellent treatment. Therefore, additional process has to be incorporated to check if the oil repellent film is assuredly formed, thereby increasing the time and being efficient.

Then, it has been proposed to add carbon black in the transparent and colorless oil repellent agent. Thereby, the operator can check the application and formation of the oil repellent agent with eyes.

It also has been proposed to add a small amount of a conventional UV (ultraviolet) chromogenic agent in the transparent and colorless oil repellent agent. In the case of this procedure, the oil repellent agent is dried at room temperature, and then an UV light is irradiated in order to check the state of the application with eyes. After the check, a heating process is applied to vaporize the solvent and the UV chromogenic agent included in the oil repellent agent, thereby stabilizing the oil repellent film.

However, while the shaft and the sleeve can be moved in the sliding manner at the beginning or stop of the rotation, the oil repellent film made of the conventional oil repellent agent including carbon black could disperse fine particles of carbon black, thereby contaminating the inside of the dynamical pressure bearing, which can cause the locking of the motor. Additionally, since the application and formation of the oil repellent agent has to be checked over the original color of the materials of the shaft and the sleeve to which it is applied, coloring agents such as carbon black are sometimes inconvenient in performing the check.

Also, in case where the conventional UV chromogenic agent is added into the oil repellent agent, the oil repellent agent is applied, and then the operator can check the formation of the oil repellent film with eyes by irradiating an UV light. However, when the oil repellent film is cured and dried at a temperature of 100° C. or more, the conventional UV chromogenic agent is vaporized, sublimated or decomposed. Therefore, after the oil repellent film is cured and dried, the color development from the oil repellent film cannot be obtained by the UV irradiation. Thus, conventionally, it was inconvenient to simply check the unevenness of the oil repellent agent just before the assembling of the motor, or to check the unevenness or mis-application of the oil repellent agent after the assembling of the motor.

BRIEF SUMMARY OF INVENTION

The objectives of the present invention are to increase the efficiency in checking with eyes whether the oil repellent agent is applied, and to avoid irregular application or mis-application in the process of production of the dynamical pressure bearing devices and motors. Another objectives are to add a novel chromogenic substance into an oil repellent agent to maintain the chromogenic effects or color development effects at the time of the UV irradiation even after heating it at a temperature of 100° C. or more, without sublimation of the chromogenic substance. Thereby, a novel dynamical pressure bearing device, a motor and a recording disc driving device can be provided, in which any contamination can be avoided which causes the disc surface grime.

In order to accomplish the objectives of the present invention, there is provided a dynamical pressure bearing device, comprising: a shaft having a first bearing surface and a first portion exteriorly adjacent to the first bearing surface; a sleeve having a second bearing surface and a second portion exteriorly adjacent to the second bearing surface, the sleeve being rotatably engaged with the shaft with a clearance; a dynamical pressure generation groove formed on at least one of the first bearing surface and the second bearing surface; a lubricant filled in the clearance; and an oil repellent film formed on at least one of the first portion and the second portion. The oil repellent film comprises: a fluorine polymer having a perfluoroalkyl group; and a chromogenic substance which makes color development in blue at UV irradiation.

In the dynamical pressure bearing device of the present invention, the shaft is relatively rotated with respect to the sleeve, which generates a dynamical pressure through the lubricant interposed over the thrust bearing and the radial bearing. The dynamic pressure is necessary for adjusting the local relationship between the shaft and the sleeve. The raising of the pressure in the lubricant generates a force to exhaust the lubricant. In order to avoid the exhaust or leakage of the lubricant, the phase boundary exteriorly adjacent to the lubricant is provided with a film including a fluorine polymer having a perfluoroalkyl group featured in both water and oil repellent properties. Additionally, such an oil repellent film includes a chromogenic substance for checking with eyes if the oil repellent film is assuredly applied or formed.

There is also provided a motor comprising: the dynamical pressure bearing device as explained above; a rotor magnet provided on one of the shaft and the sleeve; and a stator provided on the other of the shaft and the sleeve. The stator is opposed to the rotator magnet.

The motor of the present invention can prevent the leakage of the lubricant by means of the effects by the oil repellent film, providing a spindle motor appropriately used at a high speed rotation, with extended life.

There is also provided a driving device for recording disc, comprising: a housing fixed to the stator of the motor as explained above; a recording disc provided on the rotator of the motor as explained above; and a head housed in the housing. The head can write and read information on the recording disc.

The disc driving device of the present invention can prevent the generation of gases from the motor by the effects of the oil repellent film. Also, it can prevent any contamination to make the recording disc grime, preventing errors in writing or reading information, thereby providing a reliable recording disc driving device.

BRIEF DESCRIPTION OF DRAWINGS

FIG. 9 shows the results of the evaluation with respect to various concentrations of the fluorine type polymer of the present invention included in the oil repellent agent.

FIG. 10 shows results of the evaluation with respect to various concentrations of the fluorescer included in the oil repellent agent of the present invention.

FIG. 11 shows results of evaluation with respect to the gas generation from the oil repellent agents of Example and Comparative Examples

DETAILED DESCRIPTION OF INVENTION

With reference to the drawings, the present invention is hereinafter described more in detail based on an embodiment of a dynamical pressure bearing device of the present invention, which is applied to a spindle motor of the present invention. It is acknowledged that the present invention is not intended to limit thereto, and can be modified within the spirit of the present invention.

Figure 1:
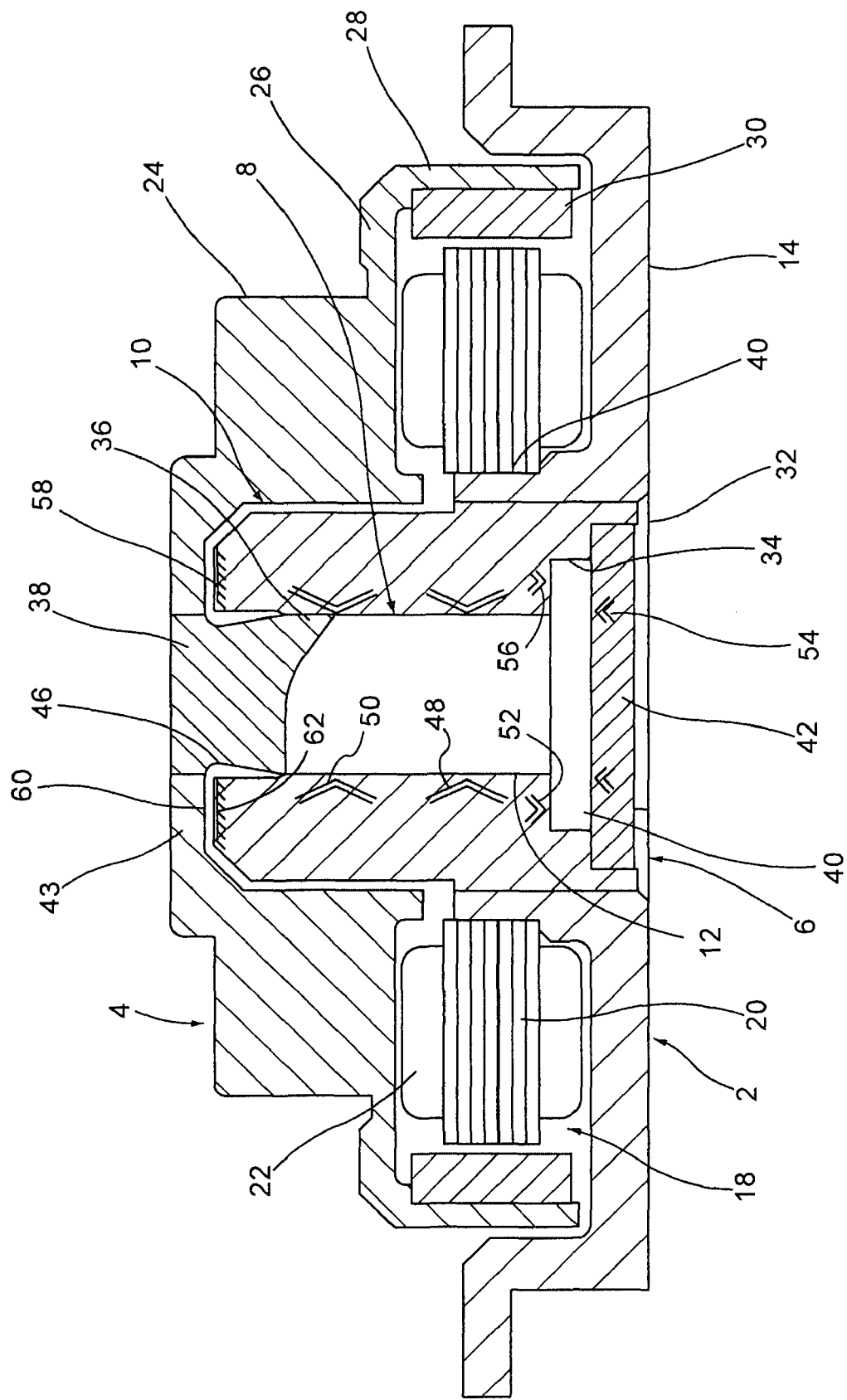
FIG. 1 shows a cross sectional view of an embodiment in which a fluid dynamical pressure bearing device of the present invention is applied to a spindle motor for driving an HDD.

FIG. 1 is a cross sectional view showing a spindle motor for driving an HDD provided with the dynamical pressure bearing device of the present invention. In FIG. 1, the spindle motor as shown has a housing 2 having cylindrical external shape, a rotor 4 relatively rotatable with respect to the housing 2, and a dynamical pressure bearing device interposed between the housing 2 and the rotor 4. The dynamical pressure bearing device 6 has a shaft 8 as a shaft, a sleeve 10 as a sleeve which is rotatably engaged with the shaft 8, and a lubricant 12 interposed between the shaft 8 and the sleeve 10. The housing 2 has a generally cylindrical housing 14 (housing 101 in FIG. 2), the inside surface of the housing 14 having a support sleeve wall 16 which is cylindrically formed, and a stator 18 is externally engaged with the support sleeve wall 16. The stator 18 has a stator core 20 in which core plates are laminated, and a driving coil 22 certainly wired on the stator core 20, the stator core 20 being engaged with the outside surface of the support sleeve wall 16.

The rotor 4 has a hub 24 as a rotor body which is cylindrically shaped, the lower and peripheral end of the hub 24 having a circularly shaped disc table 26 outwardly projected in the radial direction. The disc table 26 is provided with a cylindrical peripheral wall portion 28 which is extended from the outer periphery of disc table 26 toward the housing 14, that is, in the downward direction of FIG. 1. On the inside surface of the cylindrical peripheral wall portion 28, a cylindrically rotor magnet 30 is provided. The rotor magnet 30 is disposed to be opposed to the stator 18 with respect to the radial direction thereof, such that rotational driving can be performed in the given direction by the magnetic interaction between the rotor magnet 30 and the stator 18, thereby the hub 24 as well as hard discs (hard disc plate 103 in FIG. 2) provided thereon can be integrally rotated.

Then, the dynamical pressure bearing device 6 interposed between the housing 2 and the rotor 4 is described in detail. The dynamical pressure bearing device 6, as shown, has the sleeve 10 which is cylindrically shaped, and a first end of the sleeve at the lower end of the sleeve in FIG. 1. The first end of the sleeve 10 is internally engaged with the inside surface of the support sleeve wall 16 of the housing 14. The sleeve 10 has a second end, which is extended from the first end in the upper direction of FIG. 1. The inner diameter near the first end of the sleeve 10 is stepwise enlarged, to be provided with a small inner diameter portion 36, a middle inner diameter portion 34 and a large inner diameter portion 32. The sleeve 10 is made of a metal material selected from the group consisting of stainless steel, aluminum and copper, and especially it can be made of DHS (trademark) because it is excellent in freemachining so that the dynamical pressure generation groove of the present invention can be formed precisely.

The shaft 8 has a shaft part 38 and a thrust plate 40 provided on a first end of the shaft part 38 (that is the lower end of the shaft 8 in FIG. 1), the outer diameter of the shaft part 38 corresponding to the inner diameter of the small inner diameter portion 36 of the sleeve 10, and the outer diameter of the thrust plate 40 corresponding to the inner diameter of the middle inner diameter portion 38. The thrust plate 40 can be integrally formed with the shaft part 38, but alternatively the thrust plate can be formed separately which can be then fixed to the shaft part 38. As shown in FIG. 1, the shaft 8 is installed into the sleeve 10 such that the shaft part 38 is inserted from the large inner diameter portion 32 of the sleeve 10, and thereafter, the large inner diameter portion 32 is closed by a closing material 42. The shaft 8 has a second end which is projected from the sleeve body 10, where the side wall 43 of the hub 24 is fixed. The shaft 8 is made of a material selected from the group consisting of stainless steel and aluminum, and for example is made of SUS420J2.

In case of the dynamical pressure bearing device 6 having the structure as explained above, the clearance or gap between the shaft 8 and the sleeve 10 is exteriorly opened at the side of another ends of the shaft 8 and the sleeve 10. However, the portions other than the side of the second ends of the shaft 8 and the sleeve 10 are sealed or closed, inside which a lubricant 12 is filled. Thereby, the portion filled with the lubricant can be served as a fluid dynamical pressure bearing. Namely, if focusing on the shaft 8, the lubricant 12 is substantially lubricated on the outer surfaces of the shaft part 38 and the thrust plate 40 fixed to the shaft part 38. The shaft part 38 of the shaft 8 has a taper portion 46 at the second end thereof, which avoids the lubricant 12 from leakage. The taper portion 46 has a tapered surface where the outer diameter of the shaft part 38 is radially tapered or reduced toward the second end of the shaft 8, thereby the tapered surface avoiding the lubricant 12 from leakage by means of capillary action.

In case of the dynamical pressure bearing device 6 shown in the drawing, the sleeve 10 is provided with a pair of radial dynamical pressure generation means 48, 50 at the inner surface of the small inner diameter portion 36, each of the radial dynamical pressure generation means 48, 50 being positioned with an interval between one and the other in the shaft direction (that is, in the vertical direction in FIG. 1). The radial dynamical pressure generation means 48, 50 can be formed of a dynamical pressure generation groove having a herringbone shape, which increases the pressure in the lubricant 12 to support the load worked on the rotor 4 in the radial direction. The radial dynamical pressure generation means 48, 50 can be formed at the outer surface of the shaft part 38 of the shaft 8, or alternatively can be formed at both of the outer surface of the shaft part 38 and the inner surface of the small inner diameter portion 36 of the sleeve 10.

Also, a pair of thrust dynamical pressure generation means 54, 56 are provided such that the thrust plate 40 is supported in the thrust or shaft direction. Namely, one thrust dynamical pressure generation means 56 is formed on the support end surface 52 of the sleeve 10, where it is opposed to the upper end surface of the thrust plate 40. The other thrust dynamical pressure generation means 54 is formed on the upper surface of the closing material 42, where it is opposed to the lower end surface of the thrust plate 40. The thrust dynamical pressure generation means 54, 56 can be formed of a dynamical pressure generation groove having a herringbone shape, which increases the pressure in the lubricant 12 to support the load worked on the rotor 4 in the thrust direction. Alternatively, the thrust dynamical pressure generation means 54, 56 can be formed at the upper end surface and the lower end surface of the thrust plate 40, or can be formed at both of the thrust plate 40, and the support end surface 52 and the closing material 42, as explained. It is acknowledged that in FIG. 1, the dynamical pressure generation grooves of the dynamical pressure generation means 48, 50, 54, 56 are symbolically illustrated, but practically, several dynamical pressure generation grooves can be radially formed at the surface as mentioned above.

Figure 2:
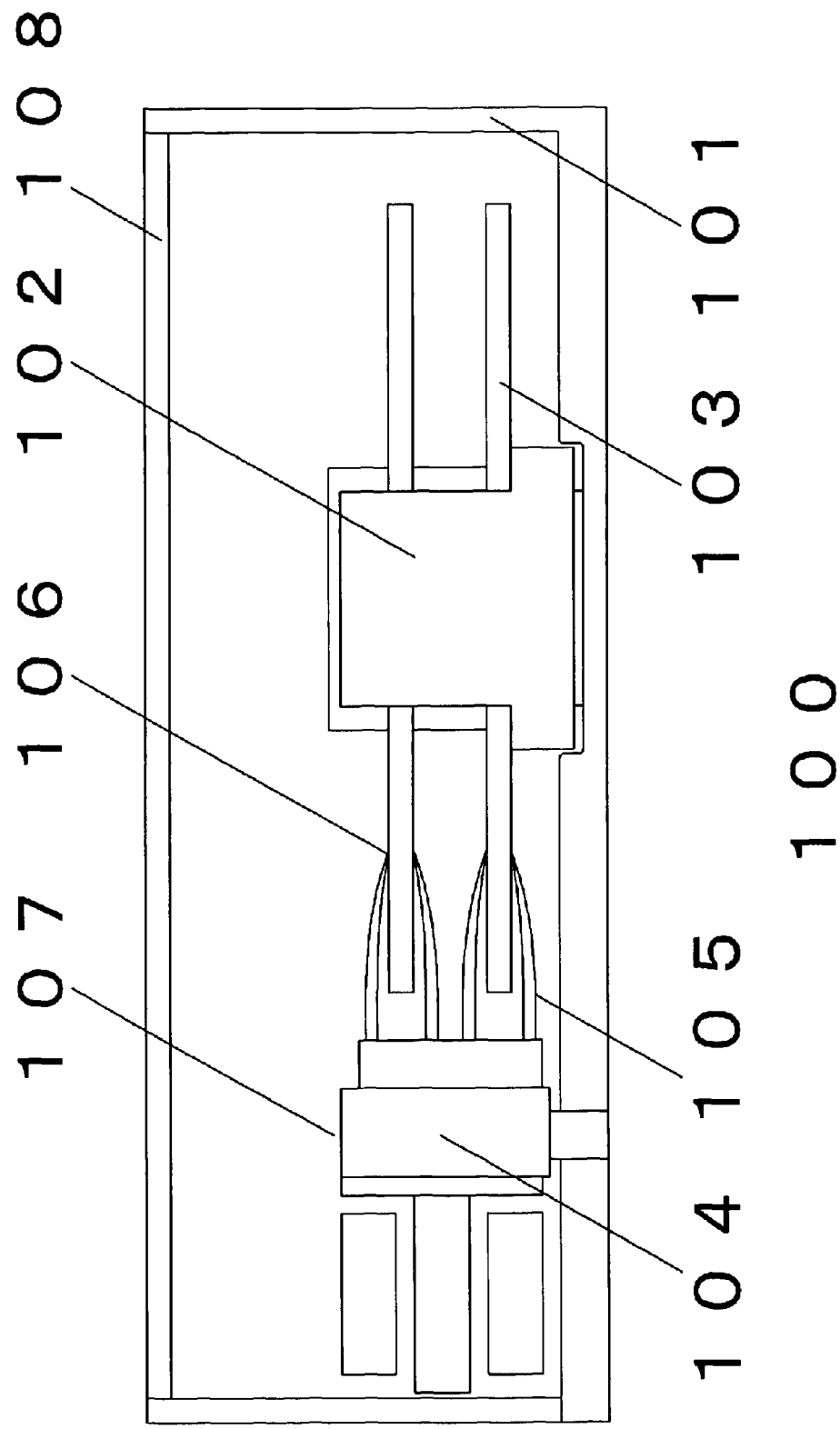
FIG. 2 shows a cross sectional view of the recording disc driving device of the present invention.

Then, the internal structure of the recording disc driving device 100 is described in detail with reference to FIG. 2. The inside of the housing 101, 108 is formed of a clean space free from dusts and dirt, which houses a spindle motor 102 provided with circular disc plates 103 such as hard discs for memorizing information. Additionally, the inside of the housing 101, 108 houses a head transfer mechanism 107 for reading and writing information on the disc plates 103. The head transfer mechanism 107 has a head 106 for reading and writing information on the disc plates 103, arms 105 for supporting the head, and an actuator 104 for certainly transferring the head 106 and the arms 105 to a given place on the disc plates 103.

While the dynamical pressure bearing device, the spindle motor using the bearing device, and the recording disc driving device of the present invention are described here as embodiments, the second ends of the shaft 8 and the sleeve 10 are further subjected to oil repellent treatment at the area exteriorly adjacent to the dynamical pressure bearing, in order to avoid the lubricant 12 from oozing and leakage. Namely, in FIG. 1, an oil repellent film 58 is formed over the area including the end surface of the second end of the sleeve 10, where the area of the small inner diameter portion 36 forming the oil repellent film 58 is opposed to the taper portion 46 of the shaft 8. In addition, another oil repellent film 60 is formed over the area including the outside surface of the taper portion 60 of the shaft part 38 extended to the inner surface of the end wall 43 of the hub 24, where the area forming the oil repellent film 60 is opposed to the end surface of the second end of the sleeve 10. On the areas with oil repellent film 60, there exists no lubricant. The oil repellent film 58, 60 is formed by applying an oil repellent agent including a fluorescer. The oil repellent agent including the fluorescer is applied before filling with the lubricant 12. The parts, before assembled, are subjected to the application of the oil repellent agent including the fluorescer, and therefore, the parts can be independently examined by exposing them to an UV light to check whether the oil repellent film is appropriately formed.

The oil repellent film is formed by dissolving a fluorine polymer and a chromogenic substance in a solvent.

As to the solvent used for preparing the oil repellent agent of the present invention, any solvent can be used if it can dissolve the fluorine type polymer. Examples of the solvent are ketones such as acetone, MEK and MIBK; esters such as acetate ethyl and acetate butyl; ethers such as diethyl ether and dioxane; alkanes such as heptane and hexane; alcohols such as ethanol and IPA; and a mixture thereof.

In particular, a fluorine solvent can be used as the solvent, because a fluorine solvent is unburnable so that the application facilities do not need to be equipped with special exhaust devices or explosion-proof devices. Also, the fluorine solvent is high in affinity with the fluorine polymer, so that it has a high lytic potential of the fluorine polymer. The fluorine solvent is not particularly limited, and examples of the fluorine solvent are perfluorocarbon (PFC), hydrofluorocarbon (HFC), hydrochlorofluorocarbon (HCFC), hydrofluoroether (HFE), perfluoro polyether (PFPE), and hydrofluoro polyether (HFPE).

The fluorine polymer included in the oil repellent film present invention can include a repeating unit as represented by general formula (1). In particular, the fluorine polymer has a molecular weight Mw of 3,000 to 400,000

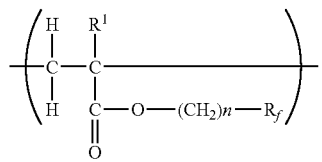
(1)

In the formula (1), $R^1$ represents hydrogen or a methyl group, Rf represents a perfluoroalkyl group having a carbon number of 2 to 16, and n represents an integer of 0 to 6.

The fluorine polymer having a perfluoroalkyl group is not particularly limited, and examples of the fluorine polymer are represented by general formulas 2 to 15, as described below.

(i) Ethylene-tetrafluoroethylene copolymer (ETFE) having a repeating unit of general formula (2).

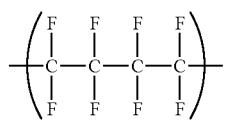
(2)

(ii) Polyvinyl fluoride having a repeating unit as represented by general formula (3).

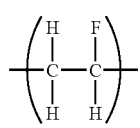
(3)

(iii) Polyvinylidene fluoride having a repeating unit as represented by general formula (4).

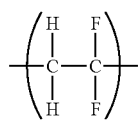
(4)

(iv) Ethylene-chlorotrifluoroethylene copolymer (ECTFE) having repeating units as represented by general formulas (5A) and (5B).

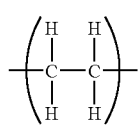
(5A)

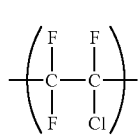
(5B)

(v) Polychlorotrifluoroethylene (PCTFE) having a repeating unit as represented by general formula (6).

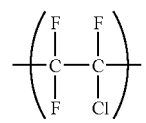
(6)

(vi) Tetrafluoroethylene-perfluoroalkylvinylether (PFA) having repeating units as represented by general formulas (7A) and (7B).

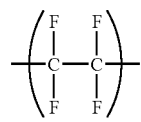
(7A)

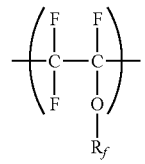
(7B)

In formulas (7A) and (7B), Rf represents a perfluoroalkyl group ($CnF_{2n+1}$) having a carbon number of 2 to 16, and particularly of 4 to 12.

(vii) Polytetrafluoroethylene (PTFE) having a repeating unit as represented by formula (8).

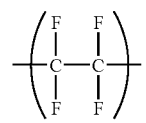
(8)

(vii) Tetrafluoroethylene-hexafluoropropylene copolymer (FEP) having repeating units as represented by general formulas (9A) and (9B).

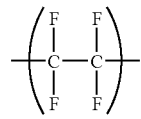
(9A)

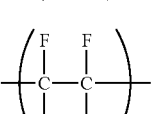
(9B)

(ix) Polyperfluoroalkylvinyl having a repeating unit as represented by general formula (10).

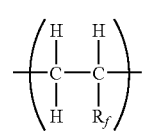
(10)

In general formula (10), Rf represents a perfluoroalkyl group ($CnF_{2n+1}$) having a carbon number of 2 to 16, and particularly of 4 to 12.

(x) Poly 2-(perfluoroalkyl)ethylvinyl having a repeating unit as represented by the general formula (11)

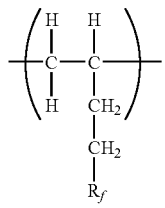

(11)

In general formula (11), Rf represents a perfluoroalkyl group ($CnF_{2n+1}$) having a carbon number of 2 to 16, and particularly of 4 to 12.

(xi) Poly perfluoroalkylvinylether having a repeating unit as represent by the general formula (12).

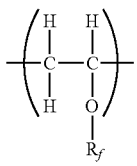

(12)

In general formula (12), Rf represents a perfluoroalkyl group ($CnF_{2n+1}$) having a carbon number of 2 to 16, and particularly of 4 to 12.

(xii) Poly 2-(perfluoroalkyl)ethylvinylether having a repeating unit as represented by general formula (13).

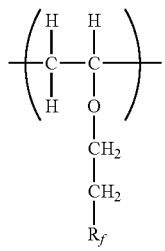

(13)

In general formula (13), Rf represents a perfluoroalkyl group ($CnF_{2n+1}$) having a car bon number of 2 to 16, and particularly of 4 to 12.

(xii) Polymers such as polyperfluoroalkylacrylate, polyperfluoroalkylmethacrylate, poly 2-(perfluoroalkyl)ethylacrylate, and poly 2-(perfluoroalkyl)ethylmethacrylate, having a repeating unit as represented by general formula (14).

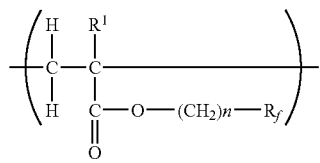

(14)

In general formula (14), n represents an integer of 0 to 6, R1 represents hydrogen or a methyl group, and Rf represents a perfluoroalkyl group ($CnF_{2n+1}$) with n being an integer of 0 to 6.

(ixx) Perfluoro polyalkenylvinylether having a repeating unit as represented by general formula (15).

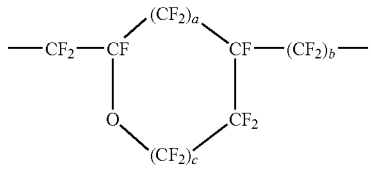

(15)

In general formula (15), "a" represents 0 or 1, "b" represents 0 or 1, and "c" represents 0, 1 or 2.

In the present invention, the polymers having the repeating units as represented by the formulas (2) to (15) can be primarily used, but the copolymer including the repeating units which are not listed here can be also used, so long as the effects of the present invention are not adversely affected.

In view of being excellent in water and oil repellent properties, the polymer having a repeating unit as represented by general formula (14) is generally used, and in particular, poly 2-(perfluoroalkyl)ethyl acrylate, poly 2-(perfluoroalkyl)ethylmethacrylate can be preferably used.

The molecular weight of the polymer is not limited, but the polymers can be used which have a molecular weight Mw of 3,000 to 400,000, where Mw means a weight average molecular weight of polystyrene conversion using GPC (solvent: tetrahydrofuran). In particular, the polymers having a molecular weight Mw of 30,000~70,000 are preferably used. The polymers having the molecular weight within the range can be excellent in film properties, and they are not brittle as well as they have sufficient solubility into a solvent.

Figure 3:
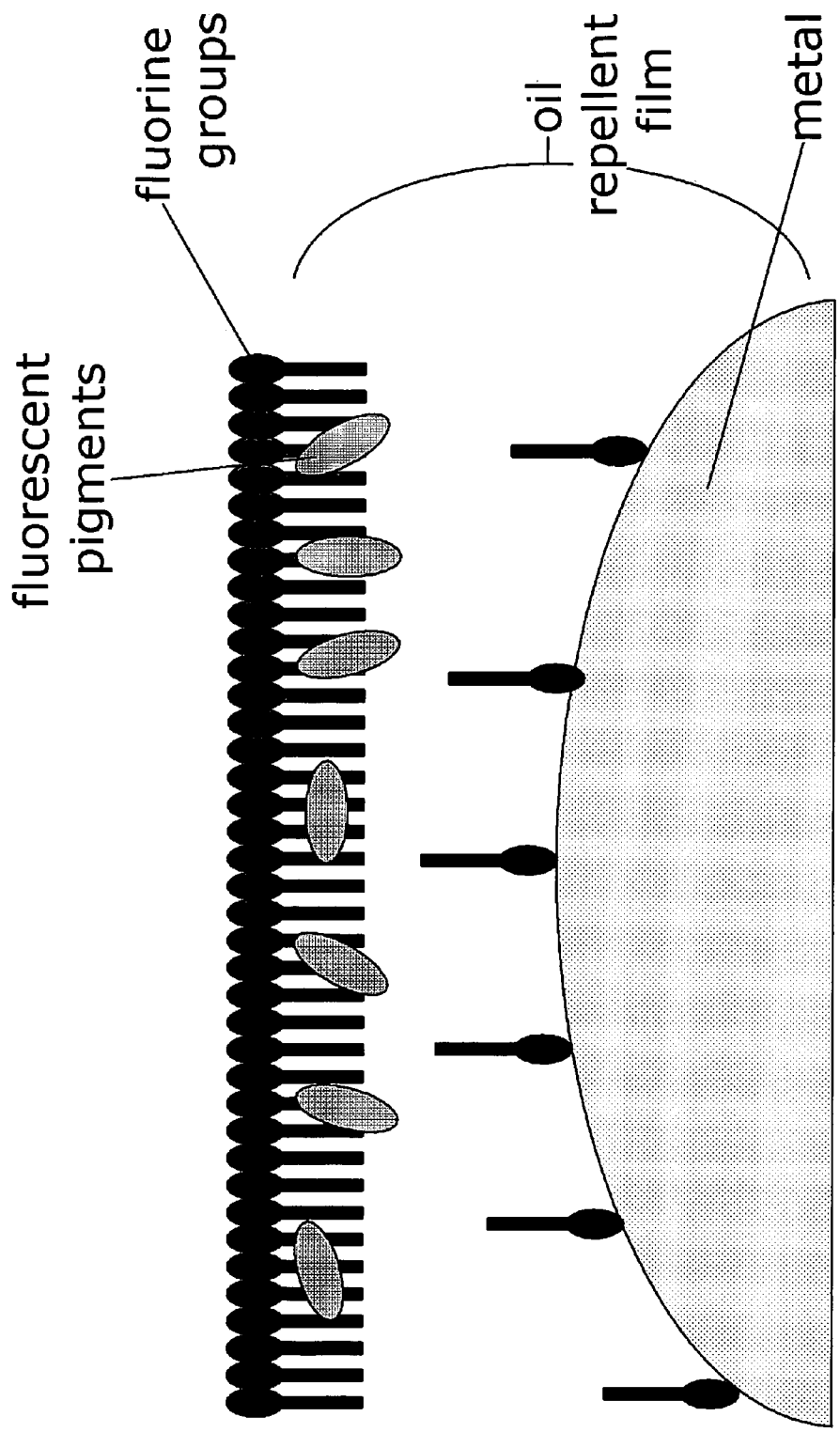
FIG. 3 shows a structural view illustrating the state that the fluorine groups included in the fluorine polymer of the present invention are located at the outside of the oil repellent film to show water and oil repellent properties.

FIG. 3 shows an illustration of the cross section showing the state where an oil repellent film is formed on a metal surface. As illustrated, the oil repellent film includes a polymer having a fluorine group and a fluorescent pigment, and the fluorine groups included in the polymer are aligned along the metal surface and the film surface, thereby showing the oil repellent property.

Also, the chromogenic substance (fluorescer) included in the oil repellent film of the present invention does not make any color development so long as it is exposed to a visible light, but makes color development in blue when it is exposed to an UV light. Any chromogenic substances which have such features can be used in the present invention, but the ones having general formulas (16) and (17) are generally used.

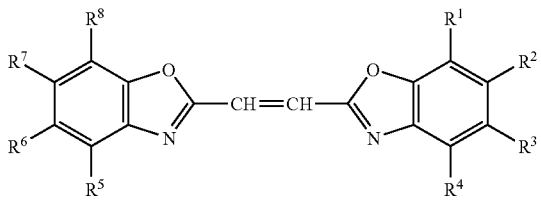

(16)

In general formula (16), $R^1$ to $R^8$ independently represent hydrogen, an alkyl group having a carbon number of 1 to 6, an alkoxy group having a carbon number of 1 to 6, an aryl group having an aryl carbon number of 6 to 18, and hydroxyl group.

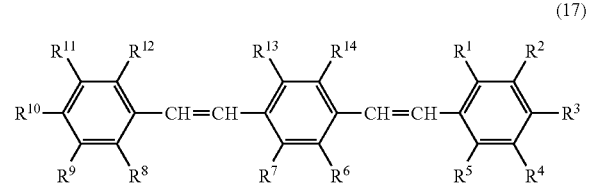

(17)

In general formula (17), $R^1$ to $R^{14}$ independently represent hydrogen, an alkyl group having a carbon number of 1 to 6, an alkoxy group having a carbon number of 1 to 6, an aryl group having an aryl carbon number of 6 to 18, and hydroxyl group.

Conventionally, organic pigments such as coumarin compounds, anthraquinone compounds, quinacridone compounds, phthalocyanine compounds and azi lake compounds are used. Such ordinary organic pigments cause a sublimation reaction at the time when a film is formed and heated and dried at a temperature of 100° C. or more, deteriorating the their color development characteristics. On the other hand, when the fluorescers as represented by general formulas (16) and (17) are used, such a sublimation reaction cannot be caused even if it is subjected to a heating and drying process at a temperature of 100° C. or more, thereby assuredly making the color development of the film when it is exposed to an UV light. Therefore, in case where the fluorescers as represented by general formulas (16) and (17) are used, a film, after it is formed, can be cured, resulting in improving the adhesion of the film to the dynamical pressure bearing device as well as the hardness of the film.

In general formula (16), $R^1$ to $R^8$ represent hydrogen, an alkyl group having a carbon number of 1 to 6, an alkoxy group having a carbon number of 1 to 6, an aryl group having a aryl carbon number of 6 to 18, and hydroxyl group. The alkyl group having a carbon number of 1 to 6, as mentioned here, can include methyl group, ethyl group, n-propyl group, isopropyl group, n-butyl group, sec-butyl group, tert-butyl group, n-pentyl group and n-hexyl group. The alkoxy group having a carbon number of 1 to 6 can include methoxy group, ethoxy group, n-propoxy group, isopropoxy group, n-butoxy group, sec-butoxy group, tert-butoxy group, n-pentoxy group and n-hexoxy group.

The aryl group having an aryl carbon number of 6 to 18 can include phenyl group, naphthyl group, anthranil group, phenanthrene group, and biphenyl group, which can be also replaced with an alkyl or alkoxy group having a carbon number of 1 to 6.

In general formula (17), $R^1$ to $R^{14}$ represent hydrogen, an alkyl group having a carbon number of 1 to 6, an alkoxy group having a carbon number of 1 to 6, an aryl group having an aryl carbon number of 6 to 18, and hydroxyl group. In particular, the alkyl group having a carbon number of 1 to 6 can include methyl group, ethyl group, n-propyl group, isopropyl group, n-butyl group, sec-butyl group, tert-butyl group, n-pentyl group and n-hexyl group. The alkoxy group having a carbon number of 1 to 6 can include methoxy group, ethoxy group, n-propoxy group, isopropoxy group, n-butoxy group, sec-butoxy group, tert-butoxy group, n-pentoxy group and n-hexoxy group.

The aryl group having an aryl carbon number of 6 to 18 can include phenyl group, naphthyl group, anthranil group, phenanthrene group and biphenyl group, which can be also replaced with an alkyl or alkoxy group having a carbon number of 1 to 6.

Further, the fluorine polymer can be included at an amount of 0.05 to 30 weight %, and in particular at an amount of 0.1 to 15 weight %, and more in particular at an amount of 0.2 to 8 weight %, in the total amount of the fluorine polymer, the chromogenic substance and the solvent. Within the range as mentioned here, an even and homogenous, which is film free from cracks, can be formed.

The chromogenic substance can be included at an amount of 500 to 10000 wt ppm, an in particular at an amount of 600 to 3000 wt ppm, and more in particular at an amount of 800 to 1500 wt ppm, in the total amount of the fluorine polymer, the fluorescer and the solvent. Within the range of the chromogenic substance as mentioned here, it can become easy to examine if the application and formation of the oil repellent agent is made, while maintaining good adhesion of the film to the dynamical pressure bearing device.

The oil repellent film of the present invention, as mentioned above, does not cause a sublimation reaction even when a thermal dry process at a temperature of 80° C. to 200° C. is performed, unlike the conventional film including ordinary organic pigments. Thus, the color development characteristics do not diminish, and sufficient adhesion and formability of film can be assured. In order to stably adhere the oil repellent film to the dynamical pressure bearing device, it can be performed at a temperature between 80° C. and 150° C.

Also, when the fluorescers having general formulas (16) and (17) are used, a heating and dry process at a temperature of 100° C. or more cause no sublimation reaction, thereby assuredly making the film color development in blue at the UV irradiation. Therefore, the film using the fluorescers having general formulas (16) and (17), after it is formed, can be cured, resulting in improving adhesion of the film to the dynamical pressure bearing device as well as the hardness of the film. In the present invention, ordinary organic chromogenic pigments such as coumarin compounds, anthraquinone compounds, quinacridone compounds, phthalocyanine compounds, azi lake compound are not used. When anthraquinone compounds or azo pigments are included as a pigment, the organic pigment included in the oil repellent film causes a sublimation reaction by a heating and dry process at a temperature of 100° C. or more, reducing the color development characteristics, resulting in making it difficult to perform an appropriate examination. However, the fluorescent pigments of the present invention causes no sublimation reaction even when the oil repellent film formed is subjected to a heating and dry process at a temperature of 100° C. of more. Thereby, the formation of the film can be easily examined with eyes by exposing it to an UV light.

It is acknowledged that the portions where the oil repellent film 58, 60 is formed are not limited to the portions as shown as the embodiment, and it can be applied to any portions where such oil repellent treatment is required.

Also, the embodiment as described here is directed to a spindle motor for driving an HDD for rotating hard discs. However, the present invention does not limited to such a spindle motor, and can be applied to any spindle motors for driving and rotating optical memory discs such as CD and DVD, and also can be used in ordinary motors

EXAMPLES AND COMPARATIVE EXAMPLES

FIGS. 4 to 11 show the results of various comparison of the fluorescent pigment oil repellent agent of the present invention with the conventional fluorescent oil repellent agents.

<Preparation of the Oil Repellent Agent>

Example 1

2 Parts by weight of poly 2-(perfluoroalkyl)ethylacrylate was dissolved in 98 parts by weight of HFE, to prepare Sample Solution A.

Into 99.9 g of Sample Solution A, 100 mg of an oxazole fluorescer having a general formula (16), in which $R^1$ to $R^8$ were hydrogen, (LOIHI MARKER 108M manufactured by SINLOIHI CO., LTD) was added and dispersed to prepare oil repellent agent A-1. In oil repellent agent A-1, the fluorescer was included at an amount of 1000 wt ppm in the total amount of poly 2-(perfluoroalkyl)ethylacrylate, the fluorescer and the solvent.

Comparative Example 1

The same procedure as preparing oil repellent agent A-1 was repeated except for that 100 mg of a dye (MACROLEX BLUE RR FG manufactured by BAYER LTD) was added into 99.9 g of Sample Solution A, so as to prepare oil repellent agent B-1. In oil repellent agent B-1, the dye was included at an amount of 1000 wt ppm in the total amount of poly 2-(perfluoroalkyl)ethylacrylate, the dye and the solvent Comparative Example 2

The same procedure as preparing oil repellent agent A-1 was repeated except for that 100 mg of a fluorescer (CARTAX CXDP POWDER manufactured by CLARIANT JAPAN Co. Ltd) was added into 99.9 g of Sample Solution A, so as to prepare oil repellent agent C-1. In oil repellent agent C-1, the fluorescer was included at an amount of 1000 wt ppm in the total amount of poly 2-(perfluoroalkyl)ethylacrylate, the fluorescer and the solvent <Formation of the Oil Repellent Film>

Each of the oil repellent agents as prepared was put into a vessel, into which a stainless steel material was put and then taken out, subsequently drying it at room temperature (one cycle dip coating). Each of the base materials had formed an oil repellent film having a thickness of around 1 µm at the surface thereof.

<Visibility Evaluation of the Oil Repellent Film>

Figure 4:
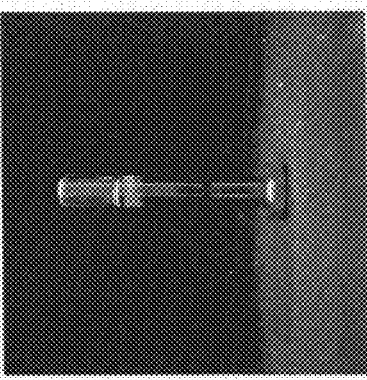
FIG. 4 shows views of the results when observing the color development of Example and Comparative Examples, in which an oil repellent agent is applied and exposed to an UV light.

FIG. 4 shows the test results of the visibility evaluation by comparing the fluorescent pigment oil repellent agent (Example 1) of the present invention with the conventional fluorescent dye oil repellent agents (Comparative Example 1 and Comparative Examples 2)

FIG. 4 shows, from the left side thereof, a fluorescent oil repellent agent of the present invention as Example 1, and conventional fluorescent oil repellent agents as Comparative Examples 1 and 2. As shown, an oil repellent film was formed around the top end of the rod-shaped stainless steel material, and evaluation was made by exposing the stainless steel material to a white light or black light, to examine with eyes if the oil repellent film showed color development. Evaluation was made by the following standard.

◎; Clear color development is observed. The existence of the oil repellent film can be confirmed by the color development, which supports that the oil repellent film has a high visibility with eyes.

○; Color development is observed.

Δ; Slight color development is observed.

X; No color development is observed.

The upper row shows the results in which the fluorescent oil repellent agent was applied to form an oil repellent film having a thickness of about 1 µm followed by drying it at ambient temperature, and the lower row shows the results of the same manner except for drying it at a temperature of 120° C. for a period of 1 hour.

As shown in the upper raw of FIG. 4, when the oil repellent film is formed by drying it at ambient temperature, clear color development was observed in all Example 1 and Comparative Examples 1 and 2 when the films were exposed to an UV irradiation. However, when the thermal dry process was applied, the oil repellent films of Comparative Examples 1 and 2 did not make color development as shown in the lower row of FIG. 4. In contrast, the oil repellent film of Example 1, even though it was subjected to the thermal dry process, made clear color development when it was exposed to an UV light as shown in the lower row of FIG. 4, confirming that the visibility with eyes of the film after the thermal dry process was equivalent to the film without the thermal dry process. It was acknowledged that even the application of the thermal dry process at a temperature of 150° C. for a period of 1 hour could produce similar trends of the results.

<Evaluations of High Temperature Test, and High Temperature and High Humidity Test of the Oil Repellent Film>

Figure 5:
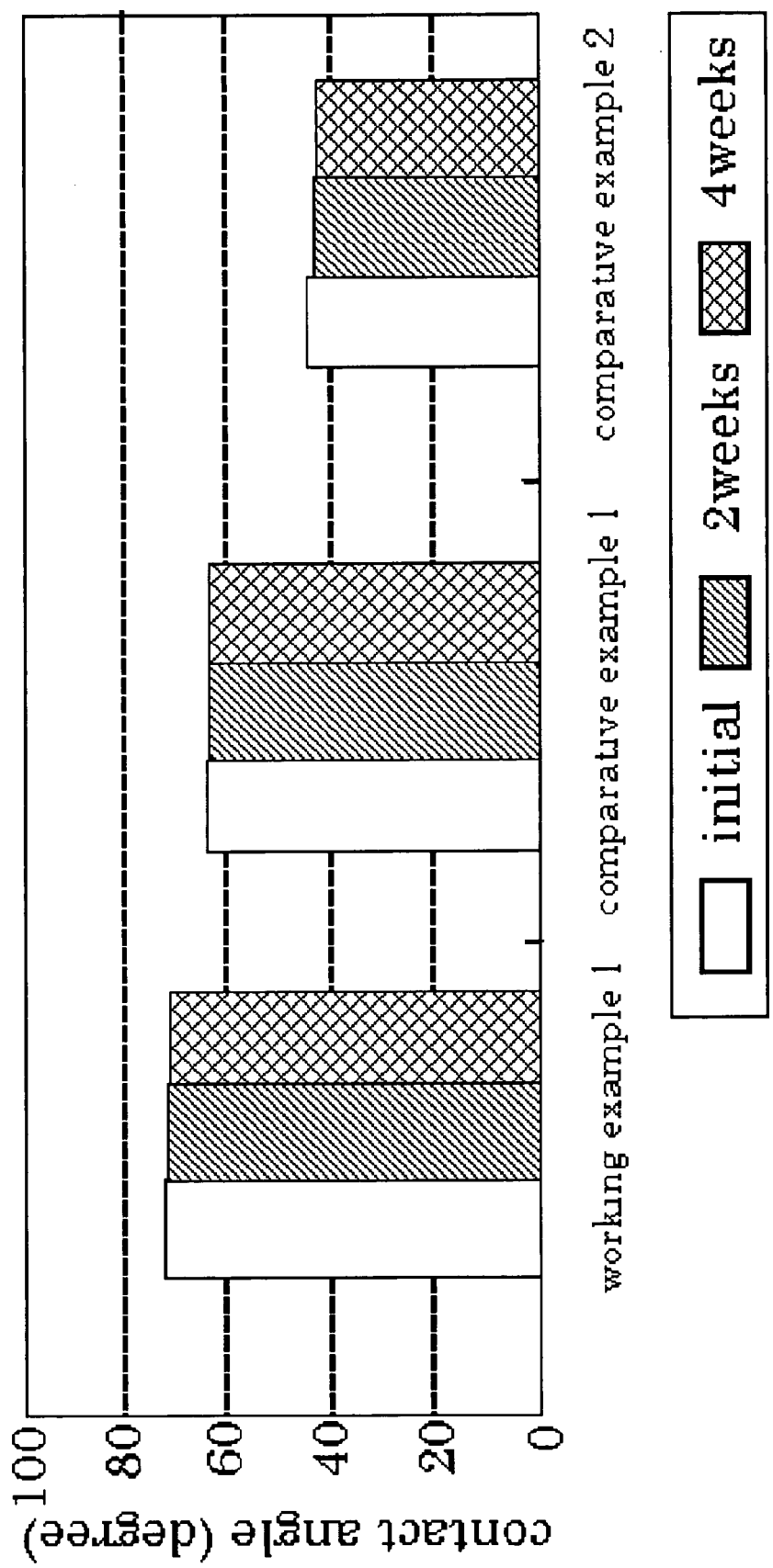
FIG. 5 shows the results showing the change of the contact angle after performing a heating test with respect to the oil repellent agents of Example and the Comparative Examples.
Figure 6:
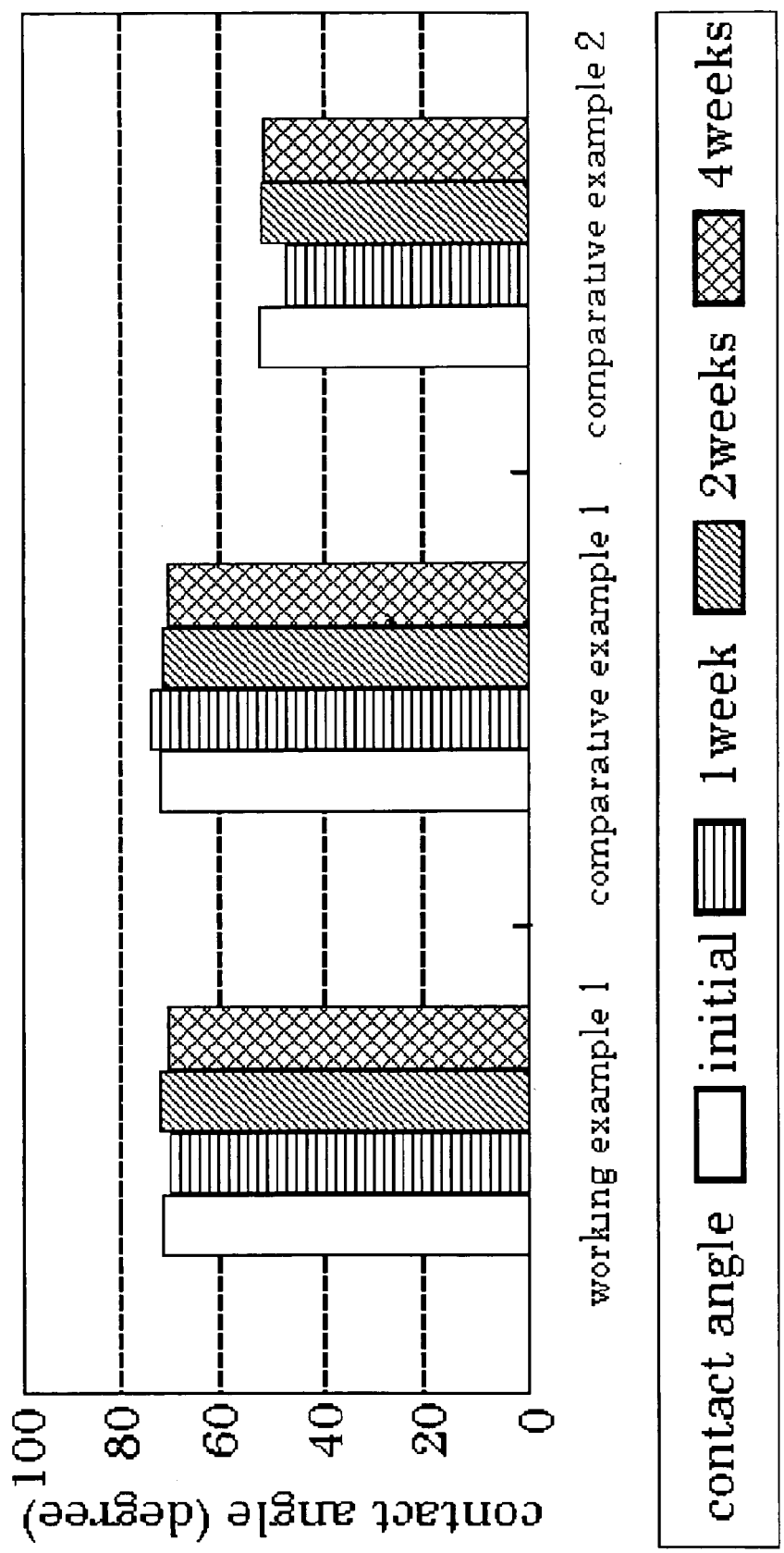
FIG. 6 shows the results showing the change of the contact angle after performing a heating and humidifying test with respect to the oil repellent agents of Example and the Comparative Examples.

FIGS. 5 and 6 show the results in which sheet-shaped stainless steel material was subjected to application of the oil repellent agent so as to form an oil repellent film having a thickness of around 1 µm, which was then subjected to a high temperature test where the temperature was set at 150° C. without humidifying as well as subjected to a high temperature and high humidity test where the temperature was set at 80° C. and the humidity was set at 90%, for evaluating the change of the oil repellent effects. The tests were performed by using a contact angle meter CA-D manufactured by Kyowa Interface Science Co., Ltd., by means of a liquid dropping method.

FIG. 5 shows the results in which the oil repellent agents of Example 1 and Comparative Examples 1 and 2 (According to FIG. 4, Comparative Examples 1 and 2 showed significant reduction of the color development when being subjected to the thermal dry process.) were applied on a sheet-shaped stainless steel to form oil repellent films and to dry them, which were then held at a temperature of 150° C., for evaluating the change of the oil repellent feature. A lubricant oil such as an ester type, polyol type and polyol ester type lubricant oils was used, which is the same one as used in the dynamical pressure bearing device. The test was conducted by using a contact angle meter. Apparent from the results, Example 1 had a contact angle of 750, whereas Comparative Example 1 had 72° and Comparative Example 2 had 55°. In other words, the contact angle of Example 1 was larger than those of Comparative Examples 1 and 2. In addition, the contact angle was maintained for a period of two weeks and even for a period of four weeks. Thus, the results corroborates that the oil repellent agent of the present invention as Example is more excellent in the oil repellent feature than those of Comparative Examples.

Similar to FIG. 5, FIG. 6 shows the results in which the oil repellent agents of Example 1 and Comparative Examples 1 and 2 (According to FIG. 4, Comparative Examples 1 and 2 showed significant reduction in the color development when being subjected to the thermal dry process.) were applied on a sheet-shaped stainless steel to form oil repellent films and to dry them, which were then subjected to a high temperature and high humidity test where the temperature was set at 80° C. and the humidity was set at 90%. The same lubricant oil as one used in the dynamical pressure bearing device was used. The test was conducted by using a contact angle meter. As results, Example 1 had a contact angle of 75°, whereas Comparative Example 1 had 72° and Comparative Example 2 had 55°. Similar to the results shown in FIG. 5, the oil repellent agent of the present invention was confirmed that it was excellent in the oil repellent feature. Also, the contact angle was maintained for a period of two weeks and even for a period of four weeks.

<Migration Test of the Oil Repellent Film>

Figure 7:
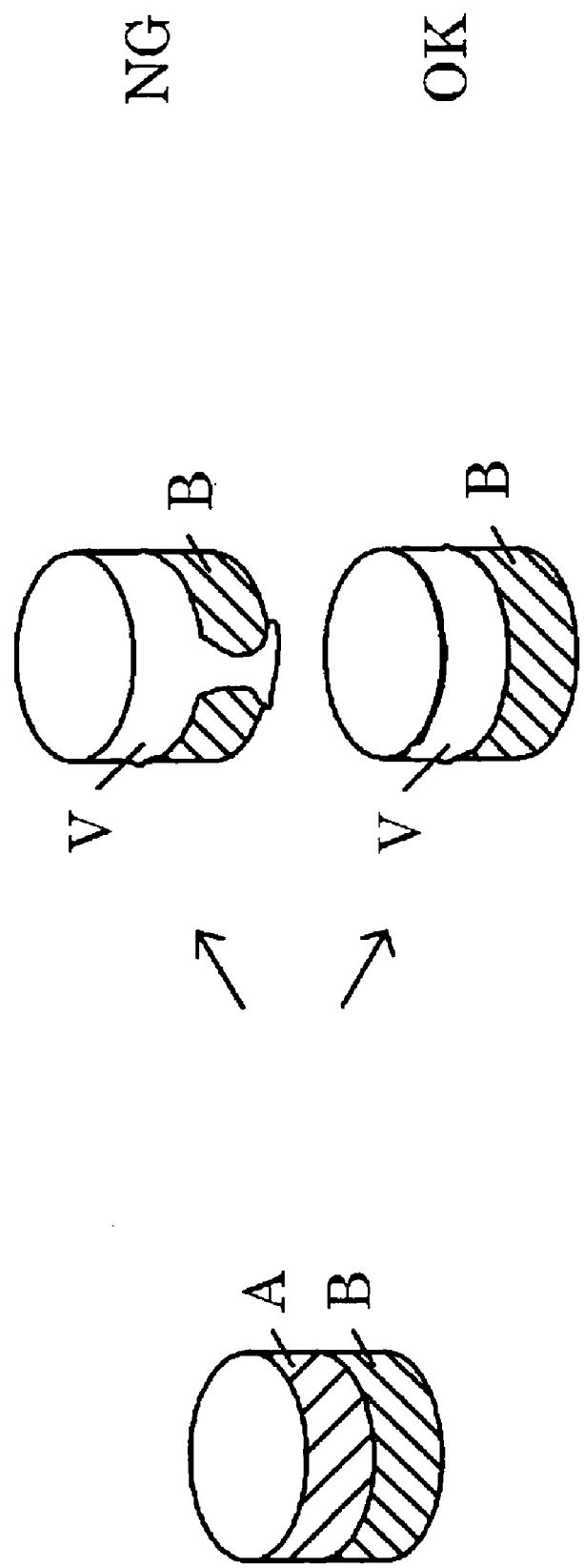
FIG. 7 illustrates the procedure for evaluating the oil repellent property of the oil repellent agents of Example and Comparative Example with respect to the lubricant.
Figure 8:
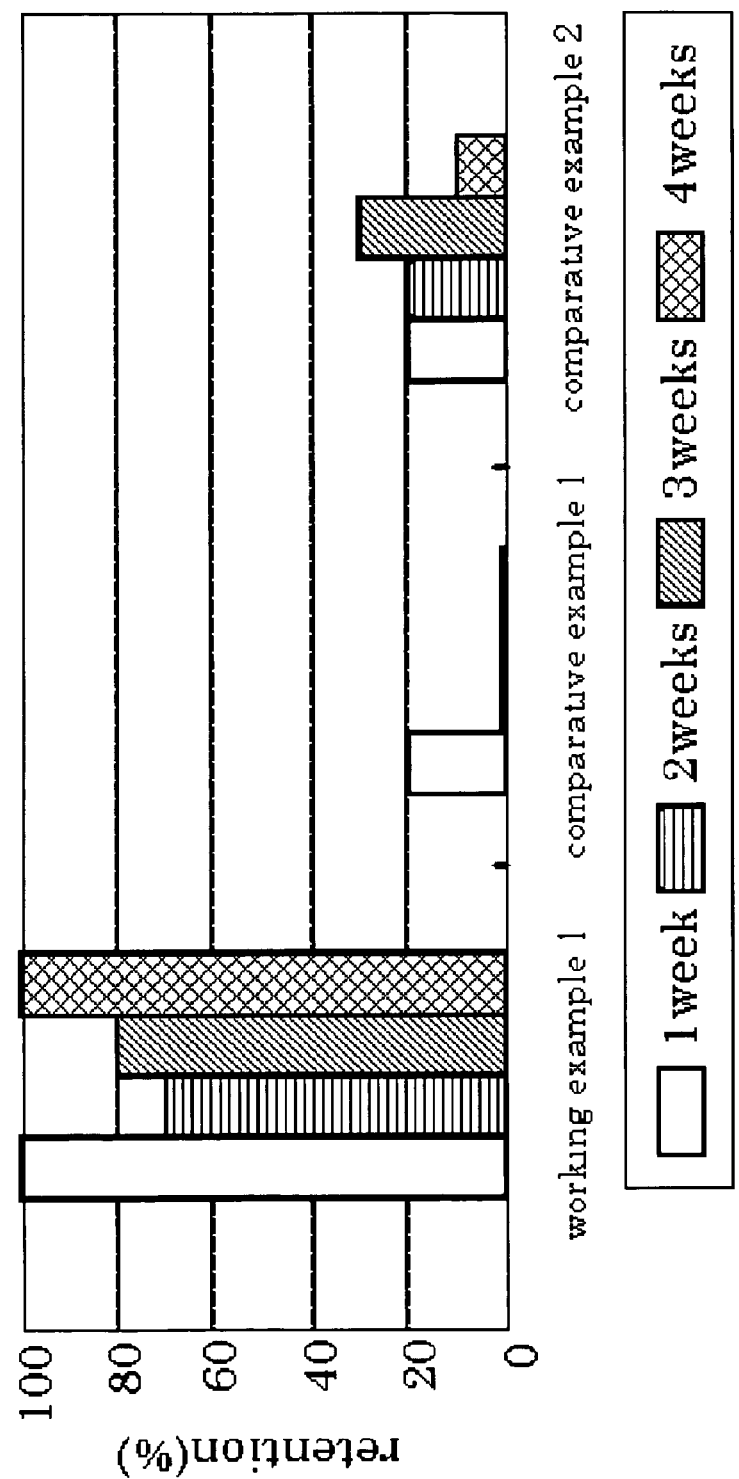
FIG. 8 shows results comparing the oil repellent property of the oil repellent film of Example of and Comparative Examples.

FIG. 7 shows the results of the evaluation test of the oil barrier feature. In this test, a cylindrical-shaped stainless steel material was used. The oil repellent agents of Example 1 and Comparative Examples 1 and 2 were applied on the entire side surface of the lower half B of the cylinder, to form an oil repellent films and to naturally dry them at ambient temperature, which were then subjected to a thermal dry process at a temperature of 80° C. for a period of 30 minutes so as to prepare samples. The samples were then held at a temperature of 100° C., for certain periods, that is, one week, two weeks, three weeks and four weeks. After the certain periods, the same lubricant 12 as one used for the dynamical pressure bearing was applied on the side surface of the upper half A of the cylinder, where the oil repellent agent was not applied, for comparing the oil barrier features. As shown in FIG. 7, evaluation was made by the following standards. Namely, the lubricant 12 was applied on the side surface of the upper half A of the cylinder, and evaluated how the oil repellent agent repels the lubricant. The case is defined to be unacceptable if the lubricant 12 drops from the upper half A to the lower half B such that the lubricant 12 adheres to the oil repellent film, as shown in the upper right side of FIG. 7. On the other hand, the case is defined to be acceptable if the lubricant 12 does not drop from the upper half A to the lower half B such that the lubricant 12 does not adhere to the oil repellent film, as shown in the lower right side of FIG. 7. In case of the lower right side of FIG. 7, the oil repellent film prevents the lubricant 12 from migration. The number of the samples which were acceptable was counted, whose results represented by the retention percentage with respect to the total number of the samples are shown in FIG. 8. Apparent from the results, the oil repellent agent of Example 1 showed significantly excellent oil repellent feature than those of Comparative Examples 1 and 2.

<Consideration of the Fluorine Polymer Concentration in the Oil Repellent Agent>

The concentration of the fluorine polymer included in the oil repellent agent of the present invention was considered.

An oil repellent agent was prepared, by dissolving 99.99 parts by weight of HFE with poly 2-(perfluoroalkyl)ethylacrylate at certain amounts, that is, 0.01, 0.05, 0.1, 0.2, 8, 15, 30 and 40 parts by weight. Thereby, sample solutions were prepared.

Into 99.9 g of each sample solution, 100 mg of an oxazole fluorescer having a general formula (16), in which R1 to R8 were hydrogen atoms, (LOIHI MARKER 108M manufactured by SINLOIHI CO., LTD) was added or dispersed, so as to prepare an oil repellent agent. In the oil repellent agent, the fluorescer was included at an amount of 1000 wt ppm in the total amount of poly 2-(perfluoroalkyl)ethylacrylate, the fluorescer and the solvent.

The oil repellent agent as prepared was applied on a glass plate and dried at room temperature to prepare a sample. Each sample was put into an environment test chamber, which repeated a cycle of the raising and decreasing of the temperature as shown below. Thereafter, the contact angle was measured and the appearance was observed to check the cracks on the portion where the oil repellent film was formed.

(Details Description of the Cycle of the Raising and Decreasing of the Temperature)

1) First, the temperature was raised from room temperature to 120° C. over about 1 hour, and maintained at a temperature of 120° C. for a period of 0.5 hours.
2) Then, the temperature was decreased from 120° C. to −30° C. over about 2 hours, and maintained at a temperature of −30° C. for a period of 0.5 hours.
3) Then, the temperature was raised from −30° C. to 120° C. over about 1.5 hours, and maintained at a temperature of 120° C. for a period of 0.5 hours.
4) Then, the temperature was decreased from 120° C. to −30° C. over about 2 hours, and maintained at a temperature of −30° C. for a period of 0.5 hours.
5) Then, the temperature was raised from −30° C. to 120° C. over about 1.5 hours, and maintained at a temperature of 120° C. for a period of 0.5 hours.
6) Then, the temperature was decreased from 120° C. to −30° C. over about 2 hours, and maintained at a temperature of −30° C. for a period of 0.5 hours.
7) Finally, the temperature was raised from ~30° C. to room temperature over about 0.5 hours.

The tests were performed by using a contact angle meter CA-D manufactured by Kyowa Interface Science Co., Ltd., by means of a liquid dropping method. Pure water was used for the measurement.

The contact angle was evaluated by the following standards

◎; The oil repellent film has a contact angle of 110° or more on the entire surface thereof.

Δ; The oil repellent film has a contact angle of 110° or less partially on the surface thereof.

Also, while the sample was exposed to a white fluorescent light, observation was made from the back surface where the oil repellent film was not formed, in order to examine with eyes if there occurred cracks thereon. The evaluation was made by the following standards.

◎; There are no cracks.

Δ; There are partial cracks.

FIG. 9 shows the results. The samples, which were prepared by the oil repellent agents including the fluorine polymer at an amount of 0.05 to 30 weight %, had a contact angle of 110° or more on the entire surface thereof, and observed no cracks thereon. Thus, it is general that the fluorine polymer is included at an amount of 0.05 to 30 weight %.

<Consideration of the Fluorescer Concentration in the Oil Repellent Agent>

The fluorescer concentration of the present invention was considered.

2 Parts by weight of poly 2-(perfluoroalkyl)ethylacrylate was dissolved in 98 parts by weight of HEF so as to prepare sample solution B. Into 99.96 g of Sample Solution B, an oxazole fluorescer having a general formula (16), in which R1 to R8 were hydrogen, (LOIHI MARKER 108M manufactured by SINLOIHI CO., LTD) was added and dispersed so as to prepare eight oil repellent agents. Each of the oil repellent agents included the fluorescer at concentrations of 400, 500, 600, 800, 1500, 10000, and 15000 wt ppm, in the total amount of poly 2-(perfluoroalkyl)ethylacrylate, the fluorescer and the solvent.

The oil repellent agent as prepared was applied on a plate-shaped stainless steel material, to form an oil repellent film having a thickness of about 1 μm thereon.

Evaluation of the oil repellent film was made by exposing the stainless steel material to a white light or black light, to examine with eyes if the oil repellent film makes appropriate color development. Evaluation was made by the following standard.

⊚; Clear color development is observed. The existence of the oil repellent film can be confirmed by the color development, which supports that the film has a high visibility with eyes.

○; Color development is observed.

Δ; Slight color development is observed.

X; No color development is observed.

Adhesiveness of the oil repellent film to the stainless steel material was evaluated. An adhesive tape having a width of 24 mm (Cellophane Tape manufactured by Nchiban Co., Ltd) was attached on a portion where the oil repellent film was formed on the plate-shaped stainless steel material. Upon the attachment, a rubber eraser was used for appropriately pressing the adhesive tape to the stainless steel material, for closely attaching it thereon. Thereafter, the adhesive tape was peeled in the perpendicular direction with respect to the stainless steel material. Then, whether or not the oil repellent film was peeled from the stainless steel material was examined.

A series of the processes of 1) attaching the adhesive tape, 2) peeling the adhesive tape and 3) the examination was defined as one cycle of the adhesiveness test. The adhesiveness was evaluated by the following standards.

⊚; The oil repellent film is not peeled even after the fifth cycle of the test.

○; The oil repellent film is peeled between the third cycle and the fifth cycle

Δ; The oil repellent film is peeled during the second cycle.

X; The oil repellent film is peeled during the first cycle.

The results are shown in FIG. 10. Where the fluorescer was included at a concentration of 400 wt ppm in the oil repellent agent, only slight color development was observed, so that it was difficult to check if the oil repellent film was assuredly formed. On the other hand, where the fluorescer was included at a concentration of 500 wt ppm in the oil repellent agent, the color development was clearly observed on the stainless steel material, and it was easy to check if the oil repellent film was assuredly formed. As the fluorescer was included at a higher concentration, the extent of the color development became stronger, which made easier to check the formation of the oil repellent film.

On the other hand, the fluorescer was included at a concentration of 15000 wt ppm in the oil repellent agent, the adhesiveness of the oil repellent film to the stainless steel material became weaker, and therefore the oil repellent film was apt to be peeled from the stainless steel material.

Therefore, in view of the visibility in examination of the formation of the oil repellent film as well as in view of the adhesiveness of the oil repellent film to the stainless steel material, the fluorescer can be included at a concentration of 500 to 10000 wt ppm. As shown in FIG. 10, the fluorescer can be included, in particular, at a concentration of 600 to 10000 wt ppm, and more in particular, at a concentration of 800 to 1500 wt ppm, in view of the visibility and the adhesiveness.

<Consideration of the Type of the Fluorine Polymer Used in the Oil Repellent Agent>

The oil repellent agent was considered by using various fluorine polymers.

In this test, the following resins E-1 to E-9 were used.

Resin E-1; ethylene-tetrafluoroethylene copolymer (ETFE)

Resin E-2; tetrafluoroethylene-perfluoroalkylvinylether (PFA)

Resin E-3; poly tetrafluoroethylene (PTFE)

Resin E-4; poly 2-(perfluoroalkyl)ethylvinylether

Resin E-5; poly perfluoroalkylacrylate

Resin E-6; poly perfluoroalkylmethacrylate

Resin E-7; poly 2-(perfluoroalkyl)ethylacrylate

Resin E-8; poly 2-(perfluoroalkyl)ethylmethacrylate

Resin E-9; perfluoro polyalkenylvinylether

The oil repellent agents were prepared as follows. 2 Parts by weight of the resins E-1 to E-9 were separately dissolved in 98 parts by weight of HEF so as to prepare solutions. Into 99.9 g of each of the solutions, 100 mg of an oxazole fluorescer having a general formula (16), in which $R^1$ to $R^8$ were hydrogen, (LOIHI MARKER 108M manufactured by SIN-LOIHI CO., LTD) was added and dispersed so as to prepare nine oil repellent agents E-1 to E-9. Each of the oil repellent agents E-1 to E-9 includes the fluorescer at a concentration of 1000 wt ppm in the total amount of the resin, the fluorescer and the solvent.

Each of the oil repellent agents was put into a vessel, and an oil repellent film was formed on the surface of a stainless steel to have a thickness of about 1 μm. The visibility and the adhesiveness of the oil repellent film were evaluated in the same manner as the test for considering the fluorescer concentration as explained before.

As results, in all the oil repellent films using the oil repellent agents E-1 to E-9, clear color development of the oil repellent film formed on the stainless steel material was observed. It was confirmed that they were high in visibility.

<Evaluation of Gases Generation Features>

Gas generation features from the fluorine polymer and fluorescer included in the oil repellent agent was evaluated. Namely, on a stainless steel material, the oil repellent agents of Example 1 and Comparative Examples 1 and 2 were applied and then subjected to a thermal dry process at a temperature between 80° C. and 120° C. so as to prepare samples. Then, the samples were subjected to heating at a temperature of 100° C. or more for a period of three hour or more, and during the heating process, gases generated therefrom were collected. FIG. 11 shows the total gas volume and the siloxane gas volume collected. According to the results, the oil repellent agent of the present invention as Example 1 showed similar results to those of Comparative Examples 1 and 2, which suppored that there were no significant increase of the gases generation due to dissolving the fluorine polymer and the fluorescer into the fluorine solvent.

It is acknowledged that in FIGS. 4 to 11, stainless steel was used as the base material, but the present invention is not limited thereto. Other materials such as austenite stainless steels including SUS303, SUS304Se and SUS304Pb; martensite stainless steels including SUS416, SUS420F and SUS420Pb; ferrite stainless steels including SUS430F can be preferably used. Also, as the base material, the present invention is not limited to stainless steels, but can use copper materials (materials whose main component is copper). The copper materials can be pure Cu, and additionally, Cu—Zn (brass), Cu—Ni, Cu—Sn (bronze), Cu—Si, Cu—Al, Cu—Be, Cu—Zu—Mn, Cu—Zu—Si, Cu—Zu—Ni, Cu—Sn—P, Cu—Sn—Zn, Cu—Zu—Sn—Fe, Cu—Zu—Sn—Mn and so on, but not limited thereto. Even on the copper materials, the formed oil repellent film can be served to have the fluorescence property and the water and oil repellent property.

In the embodiment as explained above, the ester type lubricant was used as the lubricant 12, but the present invention is not limited thereto, and other lubricants can be used. Such lubricants can include synthesized oils such as polyol ester type oils, diester type oil, poly-α-olefin type oil; and mineral oils such as paraffin type mineral oil and naphthene type mineral oil. These oils can be used alone or in combination thereof, showing a good oil repellent property by the oil repellent film of the present invention.

What is claimed is:

1. A dynamical pressure bearing device, comprising:
    a shaft having a first bearing surface and a first portion exteriorly adjacent to the first bearing surface;
    a sleeve having a second bearing surface and a second portion exteriorly adjacent to the second bearing surface, the sleeve being rotatably engaged with the shaft with a clearance;
    a dynamical pressure generation groove formed on at least one of the first bearing surface and the second bearing surface;
    a lubricant filled in the clearance; and
    an oil repellent film formed on at least one of the first portion and the second portion, the oil repellent film comprising:
        a fluorine polymer having a perfluoroalkyl group; and
        a chromogenic substance which makes color development in blue at UV irradiation, wherein the fluorine polymer is included at an amount of 0.05 to 30 weight % in the total amount of the fluorine polymer, the chromogenic substance and the solvent, wherein the chromogenic substance is included at an amount of 500 to 10000 wt ppm in the total amount of the fluorine polymer, the chromogenic substance and the solvent, wherein the chromogenic substance is represented by Formula (A) or Formula (B):

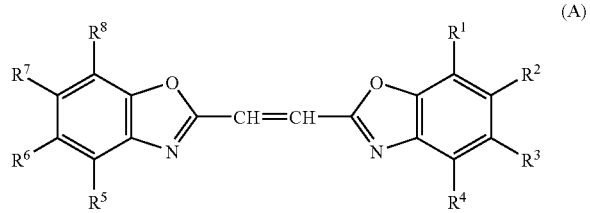

(A)

wherein $R^1$ to $R^8$ independently represent hydrogen, an alkyl group having a carbon number of 1 to 6, an alkoxy group having a carbon number of 1 to 6, an aryl group having an aryl carbon number of 6 to 18, and hydroxyl group, or

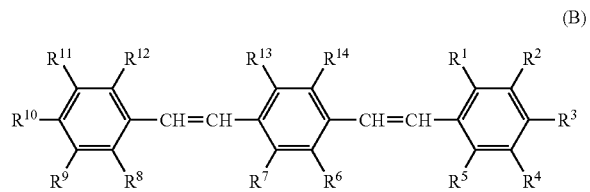

(B)

wherein $R^1$ to $R^{14}$ independently represent hydrogen, an alkyl group having a carbon number of 1 to 6, an alkoxy group having a carbon number of 1 to 6, an aryl group having an aryl carbon number of 6 to 18, and hydroxyl group.

2. A dynamical pressure bearing device according to claim 1, wherein the oil repellent film is prepared by dissolving the fluorine polymer and the chromogenic substance into fluorine solvent.

3. A dynamical pressure bearing device according to claim 2, wherein the oil repellent film is prepared by dissolving the fluorine polymer and the chromogenic substance into the solvent, and formed through thermal process at a temperature between 80° C. and 200° C. such that even after the thermal process, the oil repellent film makes color development in blue at UV irradiation.

4. A dynamical pressure bearing device according to claim 1, wherein the fluorine polymer includes a repeating unit represented by general formula (1), having a molecular weight Mw of 3,000 to 400,000:

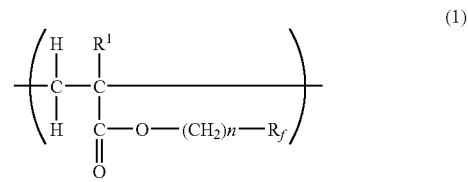

(1)

wherein R1 represents hydrogen or a methyl group, Rf represents a perfluoroalkyl group having a carbon number of 2 to 16, and n represents an integer of 0 to 6.

5. A motor, comprising:
    a dynamical pressure bearing device according to claim 1;
    a rotor magnet provided on one of the shaft and the sleeve;
    a stator provided on the other of the shaft and the sleeve, the stator being opposed to the rotator magnet.

6. A driving device for recording disc, comprising:
    a housing fixed to the stator of the motor according to claim 5;
    a recording disc provided on the rotator of the motor according to claim 5; and
    a head housed in the housing, for writing and reading information on the recording disc.

7. A dynamical pressure bearing device according to claim 1, wherein the chromogenic substance is represented by Formula (A).

* * * * *